United States Patent [19]
Chung et al.

[11] Patent Number: 5,714,954
[45] Date of Patent: Feb. 3, 1998

[54] WAVEFORM-GENERATING APPARATUS

[75] Inventors: Herman Chung; Rong-Tyan Wu, both of Hsinchu, Taiwan

[73] Assignee: Holtek Microelectronics Inc., Hsinchu, Taiwan

[21] Appl. No.: 574,393

[22] Filed: Dec. 18, 1995

[51] Int. Cl.⁶ .................................................. H03M 1/66
[52] U.S. Cl. .................................................. 341/147
[58] Field of Search .............................. 341/147, 144; 388/915

[56] References Cited

U.S. PATENT DOCUMENTS 5,583,562  12/1996  Birch et al. .............................. 348/12

Primary Examiner—Brian K. Young

[57] ABSTRACT

A cost effective waveform-generating apparatus that generates accurate and precise waveforms is disclosed. The present waveform-generating apparatus includes a memory for storing a sequence of sampled amplitudes of a waveform, said sampled amplitudes constituting at least two periods of said waveform; a counting circuit, electrically connected to the memory, responsive to a clock signal for generating counting signals; a controlling circuit, electrically connected to the memory and the counting circuit, responsive to the counting signals for controlling the memory to output the sampled amplitudes recurrently; and a digital to analog converter, electrically connected to the memory, for converting the recurrent sampled amplitudes into an analog output.

10 Claims, 7 Drawing Sheets

| \multicolumn{9}{c|}{1336HZ} | | | | | | | |
|---|---|---|---|---|---|---|---|
| step | Sampled Voltage Value | \multicolumn{7}{c|}{7 Bits (Integral 5 Bits)} | | | | | | |
| 0 | 15.5 | 0 | 1 | 1 | 1 | 1 | 1 | 0 |
| 1 | 19.43164 | 1 | 0 | 0 | 1 | 1 | 1 | 0 |
| 2 | 23.10612 | 1 | 0 | 1 | 1 | 1 | 0 | 0 |
| 3 | 26.28307 | 1 | 1 | 0 | 1 | 0 | 0 | 1 |
| 4 | 28.75471 | 1 | 1 | 1 | 0 | 0 | 1 | 1 |
| 5 | 30.35935 | 1 | 1 | 1 | 1 | 0 | 0 | 1 |
| 6 | 30.99204 | 1 | 1 | 1 | 1 | 1 | 0 | 0 |
| 7 | 30.61139 | 1 | 1 | 1 | 1 | 0 | 1 | 0 |
| 8 | 29.2423 | 1 | 1 | 0 | 0 | 1 | 0 | 1 |
| 9 | 26.97433 | 1 | 1 | 0 | 1 | 1 | 0 | 0 |
| 10 | 23.95582 | 1 | 1 | 1 | 0 | 0 | 0 | 0 |
| 11 | 20.38421 | 1 | 0 | 0 | 0 | 0 | 0 | 1 |
| 12 | 16.49313 | 1 | 0 | 0 | 0 | 0 | 1 | 0 |
| 13 | 12.53708 | 0 | 1 | 1 | 0 | 0 | 1 | 0 |
| 14 | 8.774844 | 0 | 1 | 0 | 0 | 0 | 1 | 1 |
| 15 | 5.452498 | 0 | 0 | 1 | 0 | 1 | 1 | 0 |
| 16 | 2.787361 | 0 | 0 | 0 | 1 | 0 | 1 | 1 |
| 17 | 0.953759 | 0 | 0 | 0 | 0 | 1 | 0 | 0 |
| 18 | 0.07163 | 0 | 0 | 0 | 0 | 0 | 0 | 0 |
| 19 | 0.198672 | 0 | 0 | 0 | 0 | 0 | 0 | 1 |
| 20 | 1.326577 | 0 | 0 | 0 | 0 | 1 | 0 | 1 |
| 21 | 3.381568 | 0 | 0 | 0 | 1 | 1 | 1 | 0 |
| 22 | 6.229228 | 0 | 0 | 1 | 1 | 0 | 0 | 1 |
| 23 | 9.68329 | 0 | 1 | 0 | 0 | 1 | 1 | 1 |
| 24 | 13.51782 | 0 | 1 | 1 | 0 | 1 | 1 | 0 |
| 25 | 17.48201 | 1 | 0 | 0 | 0 | 1 | 1 | 0 |
| 26 | 21.31656 | 1 | 0 | 1 | 0 | 1 | 0 | 1 |
| 27 | 24.77064 | 1 | 1 | 0 | 0 | 0 | 1 | 1 |
| 28 | 27.61833 | 1 | 1 | 0 | 1 | 1 | 1 | 0 |
| 29 | 29.67336 | 1 | 1 | 1 | 0 | 1 | 1 | 1 |
| 30 | 30.8013 | 1 | 1 | 1 | 1 | 0 | 1 | 1 |
| 31 | 30.92839 | 1 | 1 | 1 | 1 | 1 | 0 | 0 |
| 32 | 30.0463 | 1 | 1 | 1 | 1 | 0 | 0 | 0 |
| 33 | 28.21273 | 1 | 1 | 1 | 0 | 0 | 0 | 1 |
| 34 | 25.54763 | 1 | 1 | 0 | 0 | 1 | 1 | 0 |
| 35 | 22.2253 | 1 | 0 | 1 | 1 | 0 | 0 | 1 |
| 36 | 18.46308 | 1 | 0 | 0 | 1 | 0 | 1 | 0 |
| 37 | 14.50704 | 0 | 1 | 1 | 1 | 0 | 1 | 0 |
| 38 | 10.61594 | 0 | 1 | 0 | 1 | 0 | 1 | 0 |
| 39 | 7.044319 | 0 | 0 | 1 | 1 | 1 | 0 | 0 |
| 40 | 4.025781 | 0 | 0 | 1 | 0 | 0 | 1 | 1 |
| 41 | 1.757774 | 0 | 0 | 0 | 0 | 1 | 1 | 1 |
| 42 | 0.388649 | 0 | 0 | 0 | 0 | 0 | 1 | 0 |
| 43 | 0.007959 | 0 | 0 | 0 | 0 | 0 | 0 | 0 |
| 44 | 0.640606 | 0 | 0 | 0 | 0 | 0 | 1 | 1 |
| 45 | 2.245209 | 0 | 0 | 0 | 1 | 0 | 0 | 1 |
| 46 | 4.71681 | 0 | 0 | 1 | 0 | 0 | 1 | 1 |
| 47 | 7.89374 | 0 | 1 | 0 | 0 | 0 | 0 | 0 |
| 48 | 11.5682 | 0 | 1 | 0 | 1 | 1 | 1 | 0 |
| 49 | 15.49984 | 0 | 1 | 1 | 1 | 1 | 1 | 0 |

Fig. 4

| | 1477 HZ | | | | | | |
|---|---|---|---|---|---|---|---|
| step | Sampled Voltage Value | 7 Bits (Integral 5 Bits) | | | | | |
| 0 | 15.5 | 0 | 1 | 1 | 1 | 1 | 1 | 0 |
| 1 | 19.8191 | 1 | 0 | 0 | 1 | 1 | 1 | 1 |
| 2 | 23.79607 | 1 | 0 | 1 | 1 | 1 | 1 | 1 |
| 3 | 27.11585 | 1 | 1 | 0 | 1 | 1 | 0 | 0 |
| 4 | 29.51548 | 1 | 1 | 1 | 0 | 1 | 1 | 0 |
| 5 | 30.80486 | 1 | 1 | 1 | 1 | 0 | 1 | 1 |
| 6 | 30.88186 | 1 | 1 | 1 | 1 | 0 | 1 | 1 |
| 7 | 29.74037 | 1 | 1 | 1 | 0 | 1 | 1 | 1 |
| 8 | 27.47083 | 1 | 1 | 0 | 1 | 1 | 1 | 0 |
| 9 | 24.253 | 1 | 1 | 0 | 0 | 0 | 0 | 1 |
| 10 | 20.3418 | 1 | 0 | 1 | 0 | 0 | 0 | 1 |
| 11 | 16.04706 | 1 | 0 | 0 | 0 | 0 | 0 | 0 |
| 12 | 11.70898 | 0 | 1 | 0 | 1 | 1 | 1 | 1 |
| 13 | 7.671204 | 0 | 0 | 1 | 1 | 1 | 1 | 1 |
| 14 | 4.253596 | 0 | 0 | 1 | 0 | 0 | 0 | 1 |
| 15 | 1.726877 | 0 | 0 | 0 | 0 | 1 | 1 | 1 |
| 16 | 0.291205 | 0 | 0 | 0 | 0 | 0 | 0 | 1 |
| 17 | 0.060309 | 0 | 0 | 0 | 0 | 0 | 0 | 0 |
| 18 | 1.052477 | 0 | 0 | 0 | 0 | 1 | 0 | 0 |
| 19 | 3.189116 | 0 | 0 | 0 | 1 | 1 | 0 | 1 |
| 20 | 6.300969 | 0 | 0 | 1 | 1 | 0 | 0 | 1 |
| 21 | 10.14153 | 0 | 1 | 0 | 1 | 0 | 0 | 1 |
| 22 | 14.40657 | 0 | 1 | 1 | 1 | 0 | 1 | 0 |
| 23 | 18.75822 | 1 | 0 | 0 | 1 | 0 | 1 | 1 |
| 24 | 22.85177 | 1 | 0 | 1 | 1 | 0 | 1 | 1 |
| 25 | 26.36294 | 1 | 1 | 0 | 1 | 0 | 0 | 1 |
| 26 | 29.0136 | 1 | 1 | 1 | 0 | 1 | 0 | 0 |
| 27 | 30.59378 | 1 | 1 | 1 | 1 | 0 | 1 | 0 |
| 28 | 30.97828 | 1 | 1 | 1 | 1 | 1 | 0 | 0 |
| 29 | 30.13667 | 1 | 1 | 1 | 1 | 0 | 0 | 1 |
| 30 | 28.1356 | 1 | 1 | 1 | 0 | 0 | 0 | 1 |
| 31 | 25.1336 | 1 | 1 | 0 | 0 | 1 | 0 | 1 |
| 32 | 21.36846 | 1 | 0 | 1 | 0 | 1 | 0 | 1 |
| 33 | 17.13845 | 1 | 0 | 0 | 0 | 1 | 0 | 0 |
| 34 | 12.77865 | 0 | 1 | 1 | 0 | 0 | 1 | 1 |
| 35 | 8.63442 | 0 | 1 | 0 | 0 | 0 | 1 | 1 |
| 36 | 5.034054 | 0 | 0 | 1 | 0 | 1 | 0 | 0 |
| 37 | 2.262754 | 0 | 0 | 0 | 1 | 0 | 0 | 1 |
| 38 | 0.540052 | 0 | 0 | 0 | 0 | 0 | 1 | 0 |
| 39 | 0.002412 | 0 | 0 | 0 | 0 | 0 | 0 | 0 |
| 40 | 0.692423 | 0 | 0 | 0 | 0 | 0 | 1 | 1 |
| 41 | 2.555426 | 0 | 0 | 0 | 1 | 0 | 1 | 0 |
| 42 | 5.443842 | 0 | 0 | 1 | 0 | 1 | 1 | 0 |
| 43 | 9.128863 | 0 | 1 | 0 | 0 | 1 | 0 | 1 |
| 44 | 13.31858 | 0 | 1 | 1 | 0 | 1 | 0 | 1 |
| 44.5 | 15.49984 | 0 | 1 | 1 | 1 | 1 | 1 | 0 |

Fig. 5

WAVEFORM-GENERATING APPARATUS

BACKGROUND OF INVENTION

The present invention relates to a waveform-generating apparatus. More particularly, the invention provides for more accurate waveforms in cost effective and flexible waveform generating apparatus.

Industry utilizes or has proposed techniques for waveform-generating apparatus. The conventional waveform-generating apparatus, as illustrated in FIG. 1, generally includes a programmable frequency divider 1, a counter 2, a multiplexer 3, a controller 4 and a digital to analog converter (i.e., D/A converter). The operation of this conventional apparatus can be described as follows. After the programmable frequency divider 1 receives a clock signal CLK of the system, under the control of the controller 4, the frequency of clock signal CLK is divided according to the fundamental period of the desired waveform. Accordingly, the counter 2 generates counting signals according to the divided signals. The multiplexer 3 therefore sequentially rams on switches SW1 to SW16 recurrently according to the counting signals. By the partial voltage resulting from resistors R1 to R6, the sampled point voltage values of the desired waveform are generated. Finally, the resulting digital signals are converted into the analog output by the digital to analog converter 5.

Despite recent advances in the design of the waveform-generating apparatus, the above-mentioned apparatus still has many limitations. For example, in accordance with the different fundamental periods of various waveforms, the ram-on conditions of the switches SW1 to SW16 are different, and thus the fundmental periods of the counting signals from the counter 2 are different. Generally speaking, if a waveform is accurately desired, the fundamental period of the counting signals must be a multiple of that of the clock signal CLK of the system for assuring that the last sampled point voltage value is rightly obtained on the triggering edge of the clock signal CLK. Whereas, for generating kinds of waveforms with better accuracy, the fundamental period of the system clock CLK must be very small, that is to say, the frequency must be very high so that the period of the counting signals resulting from the counter 2 can be a multiple of the fundamental period of the system clock signal.

In application, the quartz oscillator is generally used for the source of the system clock CLK. In one way, the high frequency quartz (typically 3.58 MHz) is more expensive and electricity-consuming; in another way, in some special application such as timepiece (32768 Hz quartz is generally used), a single high frequency quartz is not suitable. Although two pieces of quartzes can meet the need, the cost is increased.

An alternative conventional method uses the addition of phases. The problem that the fundamental period of the generated waveform is not a multiple of that of the system clock is solved, but the method requires larger and more complicated circuits and thus increases the cost for IC manufacturing.

From the above it is seen that a cost effective waveform-generating apparatus that generates precise and reliable signals is often desired.

SUMMARY OF THE INVENTION

It is therefore an object of the present invention to provide an apparatus for easily generating accurate waveforms, even in low frequency system.

It is another object of the present invention to provide a cost effective apparatus for generating waveforms.

It is a further object of the present invention to provide a waveform-generating apparatus for flexibly generating various waveforms.

In a specific embodiment, the present invention provides a waveform-generating apparatus. The waveform-generating apparatus includes a memory for storing a sequence of sampled amplitudes of a waveform; a counting circuit, electrically connected to the memory, responsive to a clock signal for generating a counting signal; a controlling circuit, electrically connected to the memory and the counting circuit, responsive to the counting signal for controlling the memory to output the sampled amplitudes recurrently; and a digital to analog converter, electrically connected to the memory, for converting the recurrent sampled amplitudes into an analog output.

Certainly, the sampled amplitudes can constitute at least two periods of the waveform. The number of the sampled amplitudes can be [fundamental period of the waveform/fundamental period of the system clock]×N and N can be the minimum value which allows [fundamental period of the waveform/fundamental period of the system clock]×N to be an integer or a value close to an integer. Alternatively, the number of the sampled amplitudes can be 1 plus an integral part of [fundamental period of the waveform/fundamental period of the system clock]×N and N can be the minimum value which allows the decimal part of [fundamental period of the waveform/fundamental period of the system clock]×N to be 0.5 or a value close to 0.5.

Certainly, the waveform can be a sinusoidal wave, a square wave or a sawtooth wave. The memory can be ROM, EPROM, EEPROM, PLA, or RAM. The counting circuit can be a counter or a programmable counter which can generates at least one kind of counting signal. The apparatus can be used in a dual-tone multi-frequency generator.

In an alternative specific embodiment, the present invention provides a waveform-generating apparatus. The apparatus includes a memory element for storing one or more waveforms, every one of the waveforms is defined as a sequence of values representing amplitudes of the waveform; a counting circuit, electrically connected to the memory element, responsive to a clock signal for a generating counting signal; a controlling circuit, electrically connected to the memory element and the counting circuit, responsive to the counting signal for controlling the memory element to output the values corresponding to the desired waveform repeatedly; and a digital to analog converter, electrically connected to the memory element, for converting the values into an analog output.

Certainly, the values can constitute at least two periods of the desired waveform. The number of the values can be [fundamental period of the waveform/fundamental period of the clock signal]×N and N can be a minimum which allows [fundamental period of the waveform/fundamental period of the system clock]×N to be an integer or a value close to an integer. The values can be 1 plus an integral part of [fundamental period of the waveform/fundamental period of the system clock]×N and N can be a minimum which allows the decimal part of [fundamental period of the waveform/fundamental period of the system clock]×N to be 0.5 or a value close to 0.5.

Certainly, the waveform can be a sinusoidal wave, a square wave or a sawtooth wave. The memory element can be ROM, EPROM, EEPROM, PLA, or RAM.

The counting circuit can be a counter or a programmable counter which can generate at least one kind of counting signal. The apparatus can be used in a dual-tone multi-frequency generator.

The present invention achieves these benefits in the context of known process technology. However, a further understanding of the nature and advantages of the present invention may be realized by reference to the latter portions of the specification and attached drawings.

BRIEF DESCRIPTION OF THE DRAWINGS

FIGS. 4 shows the sampled point voltage values of the desired waveform of 1336 Hz resulting from the system clock of 32768 Hz;

FIGS. 5 shows the sampled point voltage values of the desired waveform of 1477 Hz resulting from the system clock of 32768 Hz;

DETAILED DESCRIPTION OF THE INVENTION

According to the present invention, the waveform-generating apparatus includes a memory for storing a sequence of sampled amplitudes of a waveform (i.e., sampled point voltage values); a counting circuit (e.g., a counter or a programmable counter), electrically connected to the memory, responsive to a clock signal for generating counting signals; a controlling circuit (e.g., a controller), electrically connected to the memory and the counting circuit, responsive to the counting signals for controlling the memory to output the sampled amplitudes repeatedly; and a digital to analog converter, electrically connected to the memory, for converting the recurrent sampled amplitudes into an analog output. The sampled amplitudes can constitute at least two periods of the waveform. The number of the sampled amplitudes can be [fundamental period of the waveform/fundamental period of the system clock]×N and N can be the minimum value which allows [fundamental period of the waveform/fundamental period of the system clock]×N to be an integer or a value close to an integer. Alternatively, the number of the sampled amplitudes can be 1 plus the integral part of [fundamental period of the waveform/fundamental period of the system clock]×N and N can be the minimum value which allows the decimal part of [fundamental period of the waveform/fundamental period of the system clock]×N to be 0.5 or a value close to 0.5.

As previously mentioned, the number of sampled voltage values stored in the memory element according to the present invention can be categorized in two conditions.

First, the number of multiple sampled voltage values stored in the memory element is [the fundamental period of the desired waveform/the fundamental period of the system clock]×N, wherein N is the minimum value which allows [the fundamental period of the desired waveform/the fundamental period of the system clock]×N to be an integer or a value very close to an integer.

Figure 1:
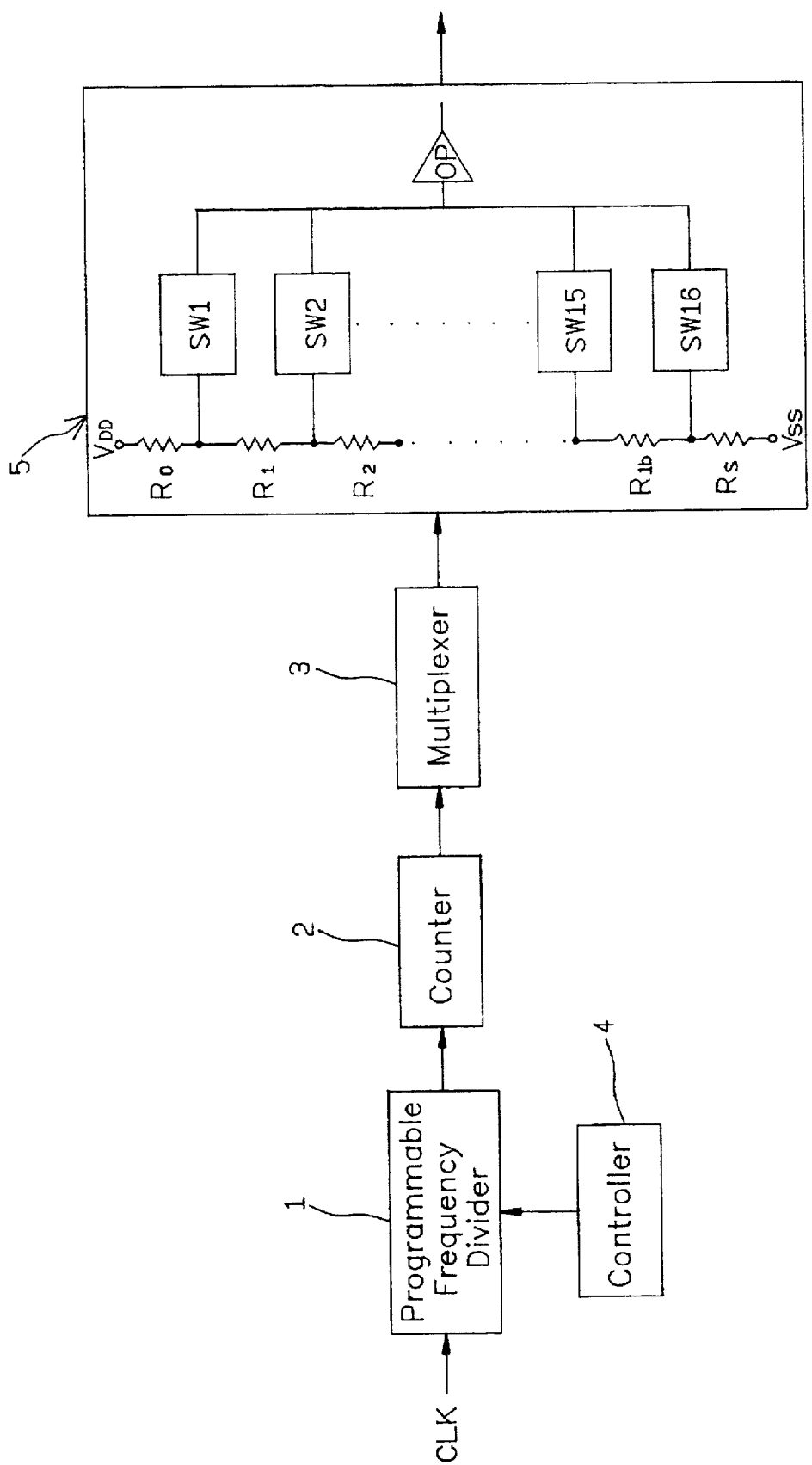
FIG. 1 is a simplified block diagram of a conventional waveform generating apparatus.
Figure 2:
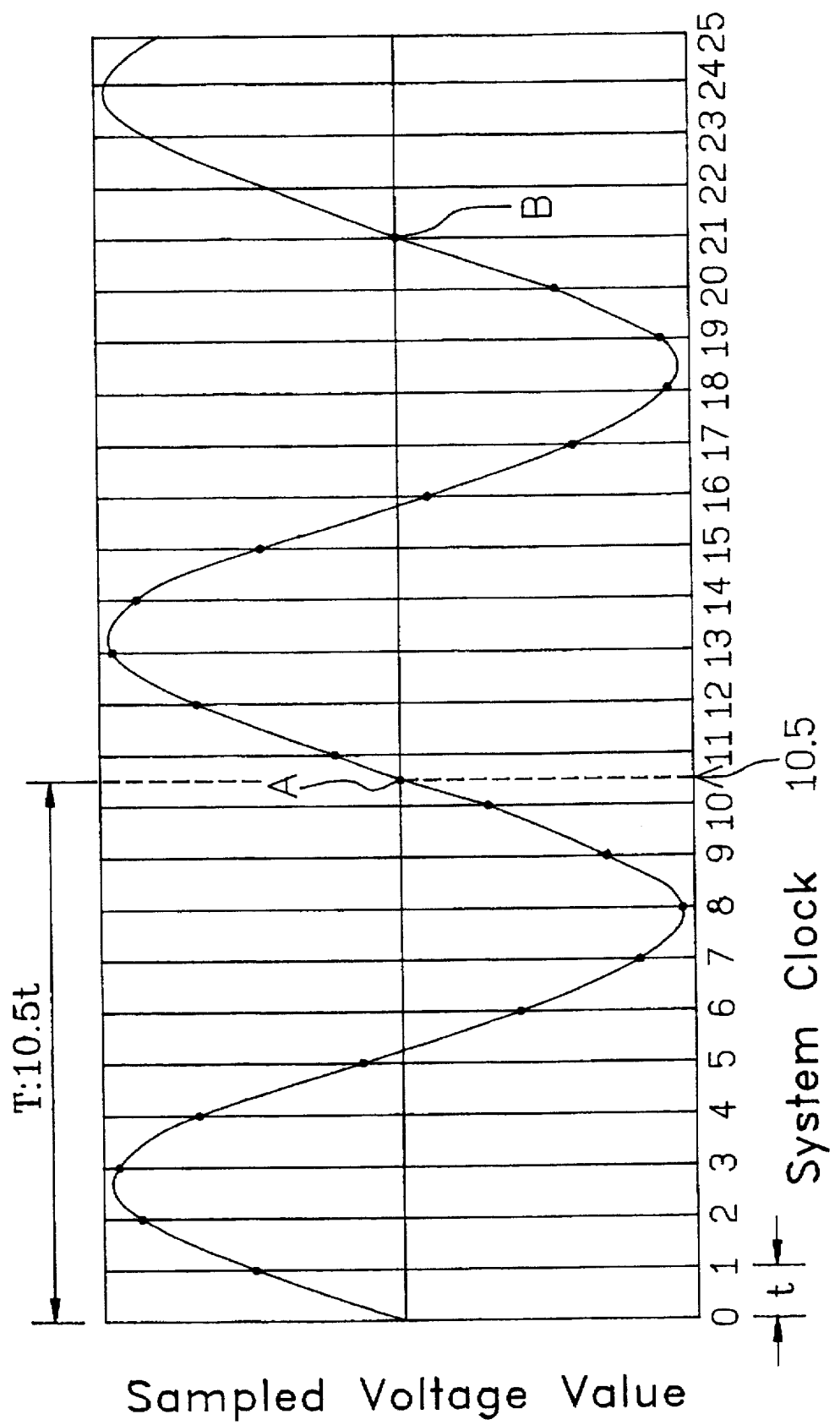
FIG. 2 shows the relation between the clock signal and the sampled point voltage values.

Referring to FIG. 2, assuming that the fundamental period of the system clock is t and the fundamental period of the desired waveform is T, when T=10.5t (where T is not an integral multiple of the system clock), the endpoint of the first period of the desired waveform is located between 10t and 11t, that is, the sampled points 10t and 11t are both not the endpoint of the first period of the desired waveform. Whereas, when the second period of the desired waveform ends, the endpoint B of the second period of the desired waveform is rightly on 21t. That is to say, repeating said two periods, we can obtain the desired periodic waveform. In other words, When T=10.5t, although T is not a multiple of the fundamental period of the system clock, two periods of the desired waveform are obtained after twenty-one sampleds. Therefore, by repeating the non-odd periods (i.e., by repeating 2, 4, 6, ... periods), in low-frequency system, all kinds of waveforms with better accuracy can be generated.

Figure 3:
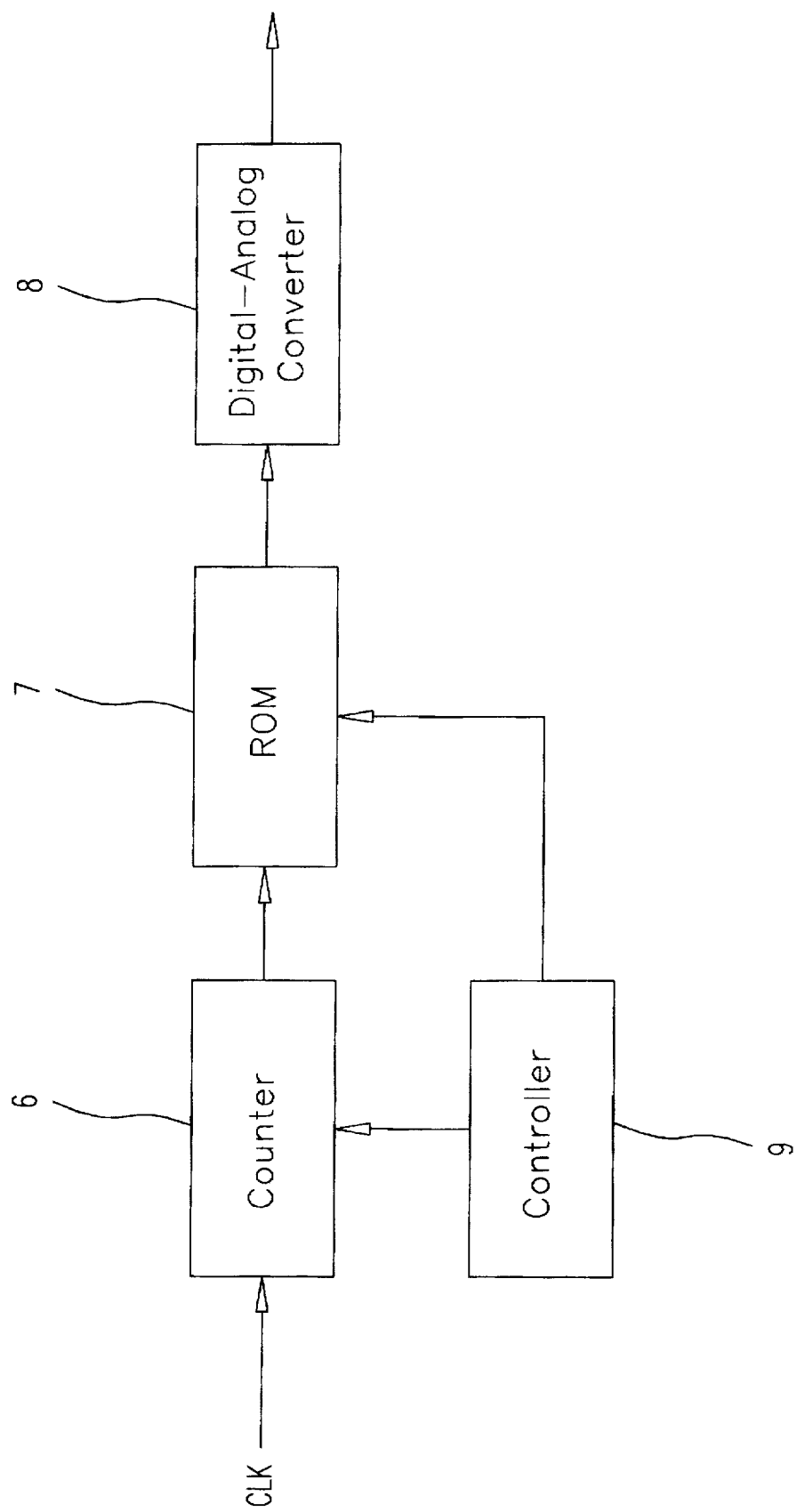
FIG. 3 schematically shows an embodiment according to the present invention.

One preferred embodiment of the present invention is shown in FIG. 3. The waveform-generating apparatus according to the present invention includes a counter 6, a memory element (ROM in this embodiment), a digital-analog converter 8 and a controller 9.

As illustrated in FIG. 4, when the system clock is 32768 Hz, the sampled point voltage values for the desired waveform of 1336 Hz are listed. These sampled point voltage values are stored in ROM 7. Similar to the above description, the fundamental period of the system clock signals is 1/32768 Hz and the fundamental period of the desired waveform is 1/1336 Hz, so the fundamental number of the sampled points is [the fundamental period of the desired waveform/the fundamental period of the system clock]×N=[32768/1336]×N=24.526×N, wherein N=2 (because 24.526×2≈49.05≈49. Thus, by 49 sampled point voltage values, two periods can be obtained.

Referring again to FIG. 3, the operation of this embodiment is briefly described. The counter 6 receives the system clock CLK, thereby generating proper counting signals. ROM 7 can store sampled point voltage values of various waveforms. The counting signals are then transmitted to ROM 7, and ROM 7 sequentially send out sampled point voltage values of step 0 to step 49 (as shown in FIG. 4). The digital-analog converter 8 receives those sampled voltage values and converted them into analog waveform outputs. By repeating step 0 to step 49, a continuous waveform of 1336 Hz is generated.

Alternatively, the second condition is: The number of the sampled point voltage values stored in the memory element is 1 plus the integral part of [the fundamental period of the desired waveform/the fundamental period of the system clock]×N, wherein N is the minimum value which allows the decimal part of [the fundamental period of the desired waveform/the fundmental period of the system clock]×N equal to 0.5 or very close to 0.5.

For example, under the system clock of 32768 Hz, a desired waveform of 1447 Hz is to be generated. According to condition 1, if the system clock is 1477 Hz, N should be 4 for allowing [the fundamental period of the desired waveform/the fundamental period of the system clock]×N= 22.1855×4≈89. Thus 89 sampled voltage values are thus to be stored in the ROM. For sparing the data-storing space of the ROM, we apply the fact that the system clock CLK has the rising edge and the falling edge. Originally, the sampled voltage values are outputted at the rising edge of the system clock signals CLK (i.e., 0t, 1t, 2t, 3t, ... ), but now the sampled voltage values are outputted at the falling edge, too. That is, the controller 9 makes the counter 7 generate counting signals at time 44.51 and allows ROM 7 to output the sampled voltage value of the step 44.5. Thus the sampled points are half decreased, thereby saving the data-storing space in ROM.

Referring to FIG. 5, under the condition of 32768 Hz system clock, the sampled voltage values of the desired waveform of 1447 Hz are shown. Similarly, the fundamental period of the system clock signal is 1/32768 Hz, the fundamental period of the desired waveform is 1/1447 Hz, the number of the sampled points is [the fundamental period of desired waveform/the fundamental period of the system clock]×N=[32768/1447]×N=22.1855×N=22.1855×2=44.37≈44.5, wherein N=2 (because the decimal part is close to 0.5).

Therefore, the number of the sampled is one plus the integer part of 44.5, i.e., 45. The sampled voltage values of step 0, step 1, step 2, . . . , step 44.5 are sequentially outputted at 0t, 1t, 2t, . . . , 44.5t. After repeat of step 0 to step 44.5, two periods of the desired waveform are obtained.

For more clearly understanding, please refer to TABLE 1. It can be clearly understood that according to the present invention, when system clock is 1336 Hz, the deviation is 1.469 Hz (i.e., the percentage is 0.11%), and when the system clock is 1477 Hz, the deviation is 4.281 Hz (i.e., the percentage is −0.29%). The maximum shift frequency is the shift frequency of the system clock signals generated by quartz oscillator. Formerly the frequency 1447 Hz is obtained by the sampling of the rising edges and the falling edges of the system clocks. Whereas, the time for the positive amplitude and the time for the negative amplitude of the waveform generated by the quartz oscillator are actually not precisely equal and are always different. Assuming after the time Tr, the waveform of multiple periods is generated. When Tr is larger, the deviation is accordingly smaller. Taking frequency 1477 Hz for example, if the maximum shift frequency of the quartz is 40%, the obtained output frequency is 1466.14 Hz and the deviation percentage is −0.736%. From TABLE 1, it can be observed that the waveform resulting from the present invention has an deviation less than 1%, which is within the acceptable extent.

TABLE 1

| Frequency (Hz) | Sampled points | Output Frequency (Hz) | Frequency Deviation | Percentage (%) | Shift Frequency (Hz) | Percentage (%) |
|---|---|---|---|---|---|---|
| 1336 | 49 | 1337.469 | 1.469 | 0.11 | N/A | N/A |
| 1477 | 44.5 | 1472.719 | −4.281 | −0.29 | 1466.13 | −0.736 |

Figure 6:
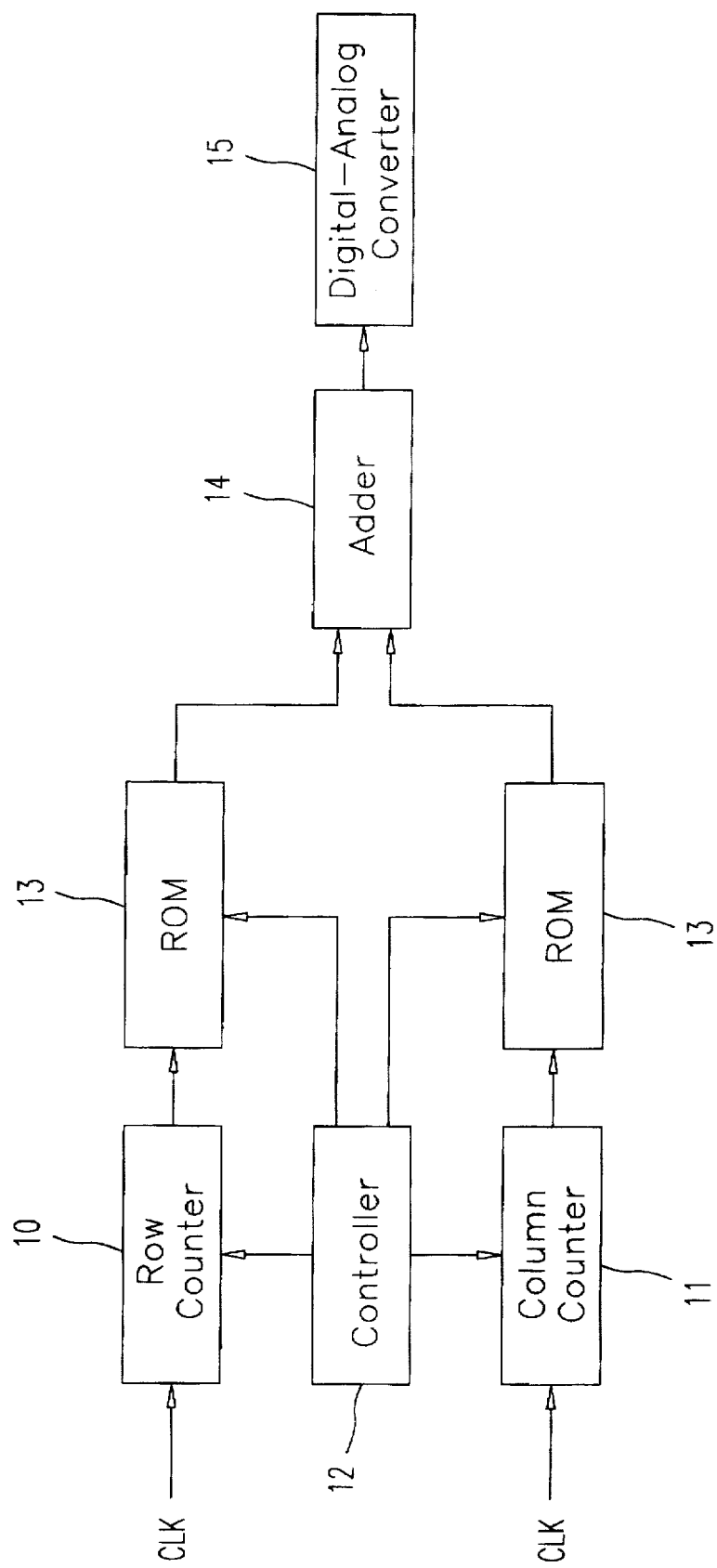
FIGS. 6 shows another preferred embodiment of the present invention, which is used in dual-tone multi-frequency generator.

Another embodiment of the present invention is shown in FIG. 6, which includes a row counter 10, a column counter 11, a controller 12, ROM 13, an adder 14, a digital-analog converter 15. The counters 10 and 11, the controller 12, ROM 13 and the digital-analog converter 15 in FIG. 6 have the same functions as those in FIG. 3, but in FIG. 6, an adder 14 is incorporated for adding the sampled voltage values and then outputting the result. The circuit can provide the waveform with the Dual Tone Multi Frequency Generator (DTMF Generator) in the telephone system.

Figure 7:
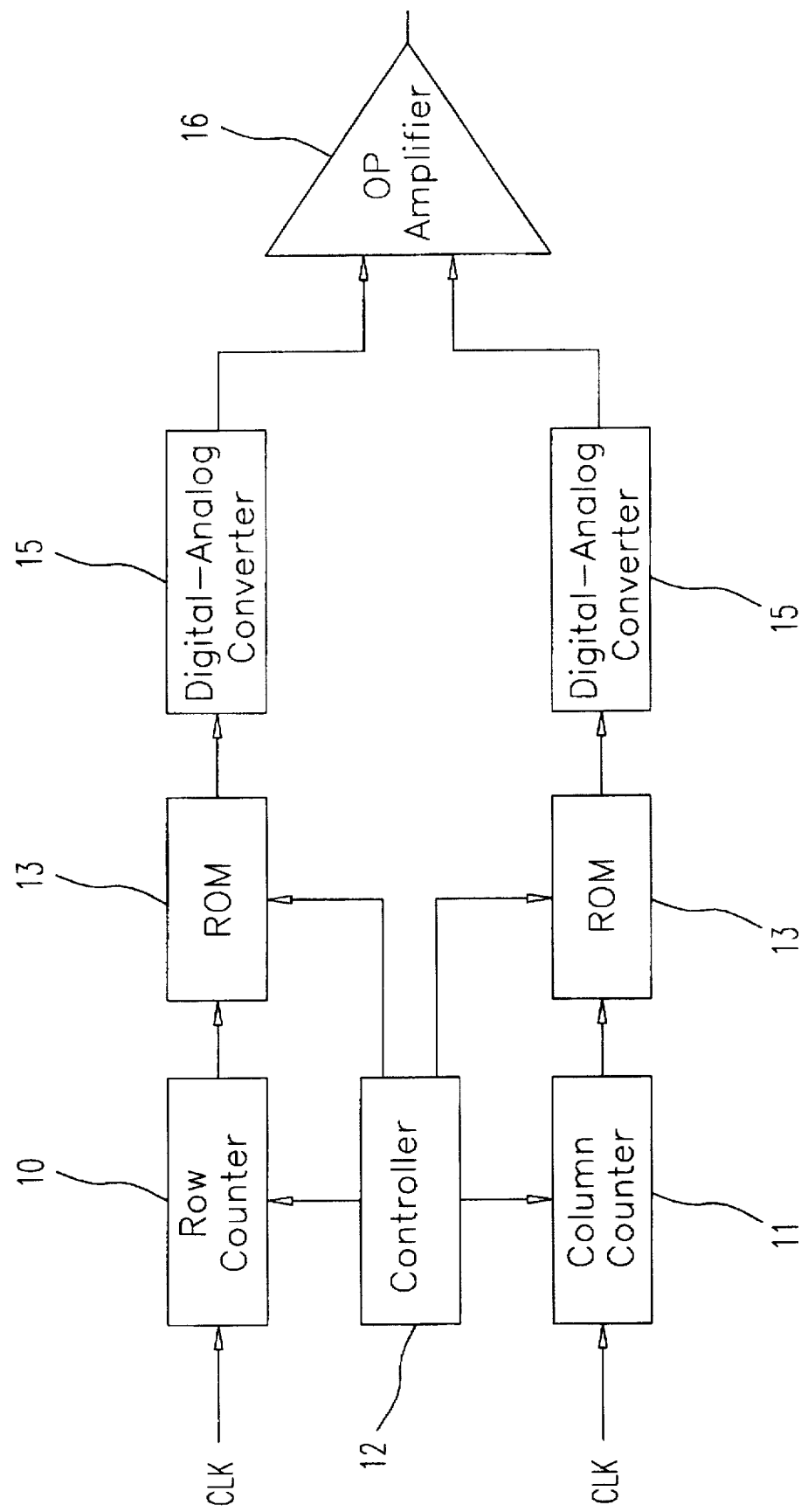
FIGS. 7 shows a further preferred embodiment of the present invention, which is used in dual-tone multi-frequency generator.

FIG. 7 shows a third embodiment of the present invention, which is similar to the one in FIG. 6. This embodiment is used for the DTMF Generator in the telephone system, too. The differences lie in that an OP amplifier 16 is incorporated in FIG. 7 to add the two analog signals, thereby lowering the noise.

To sum up, the present invention can not only generate various waveforms (for example, sinusoidal waves, square waves, sawtooth waves, among others) in low frequency system clock signals but also can lower the manufacturing cost. With respect to the application, in addition to dual-tone multi-frequency generator, the present invention can be used in many fields, for example, the personal computer with digital-analog converter to synthesize certain special waveforms and periodic waveforms.

While the above is a full description of the specific embodiments, various modifications, alternative constructions and equivalents may be used. Therefore, the above description and illustrations should not be taken as limiting the scope of the present invention which is defined by the appended claims.

What we claim is:

1. A waveform-generating apparatus for generating a waveform having a fundamental period substantially indivisible by a period of a clock signal of said waveform-generating apparatus, comprising:

a memory for storing a sequence of sampled amplitudes of said waveform, said sampled amplitudes being sampled from a sampled waveform in a duration including a plurality of said fundamental periods, wherein said duration is substantially divisible by said clock signal period;

a counting circuit, electrically connected to said memory, responsive to said clock signal for generating a counting signal;

a controlling circuit, electrically connected to said memory and said counting circuit, responsive to said counting signal for controlling said memory to output said sampled amplitudes recurrently; and a digital to analog converter, electrically connected to said memory, for converting said recurrent sampled amplitudes into an analog output.

2. The apparatus of claim 1, wherein a number of said sampled amplitudes is [fundamental period of said waveform/fundamental period of said system clock]×N and N is a minimum value which allows [fundamental period of said waveform/fundamental period of said system clock]×N to be an integer.

3. The apparatus of claim 1, wherein a number of said sampled amplitudes is [fundamental period of said waveform/fundamental period of said system clock]×N and N is a minimum value which allows [fundamental period of said waveform/fundamental period of said system clock]×N to be a value close to an integer.

4. The apparatus of claim 1, wherein said waveform is selected from a group consisting of a sinusoidal wave, a square wave and a sawtooth wave.

5. The apparatus of claim 1, wherein said memory is selected from a group consisting of ROM, EPROM, EEPROM, PLA, and RAM.

6. The apparatus of claim 1, wherein said counting circuit is a counter.

7. The apparatus of claim 1, wherein said counting circuit is a programmable counter which can generate at least one kind of a counting signal.

8. The apparatus of claim 1, wherein said apparatus is used in a dual-tone multi-frequency generator.

9. A waveform-generating application for generating a waveform having a fundamental period substantially indivisible by a half period of a clock signal of said waveform-generating apparatus, comprising:

a memory for storing a sequence of sampled amplitudes of said waveform, said sampled amplitudes being sampled from a sampled waveform in a duration including a plurality of said fundamental periods, wherein said duration is substantially divisible by said half clock signal period;

a counting circuit, electrically connected to said memory, responsive to said clock signal for generating a counting signal;

a controlling circuit, electrically connected to said memory and said counting circuit, responsive to said counting signal for controlling said memory to output said sampled amplitudes recurrently; and a digital to analog converter, electrically connected to said memory, for converting said recurrent sampled amplitudes into an analog output.

10. An apparatus according to claim 9 wherein said clock signal has a rising edge and a falling edge, and a last one of said sampled amplitudes representing said endpoint of said sampled waveform is outputted at said falling edge.

* * * * *